United States Patent
Cho et al.

(10) Patent No.: US 11,335,901 B2
(45) Date of Patent: May 17, 2022

(54) NEGATIVE ACTIVE MATERIAL FOR LITHIUM SECONDARY BATTERY, MANUFACTURING METHOD THEREOF AND LITHIUM SECONDARY BATTERY INCLUDING THE SAME

(71) Applicant: UNIST(ULSAN NATIONAL INSTITUTE OF SCIENCE AND TECHNOLOGY), Ulsan (KR)

(72) Inventors: Jaephil Cho, Ulsan (KR); Min-Seong Ko, Ulsan (KR); Sujong Chae, Daegu (KR)

(73) Assignee: UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 309 days.

(21) Appl. No.: 15/312,716

(22) PCT Filed: Jun. 9, 2015

(86) PCT No.: PCT/KR2015/005773
§ 371 (c)(1),
(2) Date: Nov. 21, 2016

(87) PCT Pub. No.: WO2015/190802
PCT Pub. Date: Dec. 17, 2015

(65) Prior Publication Data
US 2017/0194638 A1      Jul. 6, 2017

(30) Foreign Application Priority Data

Jun. 9, 2014    (KR) .................. 10-2014-0069466

(51) Int. Cl.
*H01M 4/36*     (2006.01)
*H01M 4/1395*   (2010.01)
(Continued)

(52) U.S. Cl.
CPC ............. *H01M 4/364* (2013.01); *C01B 33/02* (2013.01); *C22C 24/00* (2013.01); *H01M 4/134* (2013.01);
(Continued)

(58) Field of Classification Search
CPC .... H01M 4/364; H01M 4/134; H01M 4/1395; H01M 4/366; H01M 4/38; H01M 4/386; H01M 4/625; C01B 33/02; C22C 24/00
(Continued)

(56) References Cited

U.S. PATENT DOCUMENTS

2012/0100438 A1* 4/2012 Fasching ............... H01M 4/366
                                                      429/339
2014/0147751 A1* 5/2014 Yang ................... H01M 4/1395
                                                      429/231.8

FOREIGN PATENT DOCUMENTS

JP    2008-027912    2/2008
JP    2012-059635    3/2012
(Continued)

OTHER PUBLICATIONS

English machine translation of JP 2012084521 (Year: 2012).*
(Continued)

*Primary Examiner* — Bethany L Martin
*Assistant Examiner* — Kourtney R S Carlson
(74) *Attorney, Agent, or Firm* — Lex IP Meister, PLLC

(57) ABSTRACT

Provided are a negative active material for a lithium secondary battery, a manufacturing method thereof, and a lithium secondary battery including the same, and the present invention may provide a negative active material for a lithium secondary battery including a secondary particle in which a plurality of silicon nanoparticles are aggregated; and a plurality of metal particles distributed in pores in the
(Continued)

secondary particle, a manufacturing method thereof, and a lithium secondary battery including the same.

10 Claims, 15 Drawing Sheets

(51) Int. Cl.
    *H01M 4/134*      (2010.01)
    *H01M 4/38*      (2006.01)
    *H01M 10/0525*      (2010.01)
    *C22C 24/00*      (2006.01)
    *C01B 33/02*      (2006.01)
    *H01M 4/62*      (2006.01)
    *H01M 10/052*      (2010.01)
    *B82Y 30/00*      (2011.01)
    *H01M 4/02*      (2006.01)

(52) U.S. Cl.
    CPC ......... *H01M 4/1395* (2013.01); *H01M 4/366* (2013.01); *H01M 4/38* (2013.01); *H01M 4/386* (2013.01); *H01M 4/625* (2013.01); *H01M 10/0525* (2013.01); *B82Y 30/00* (2013.01); *H01M 10/052* (2013.01); *H01M 2004/027* (2013.01)

(58) Field of Classification Search
    USPC ........................................................ 429/212
    See application file for complete search history.

(56) References Cited

FOREIGN PATENT DOCUMENTS

| | | |
|---|---|---|
| JP | 2012-084521 | 4/2012 |
| KR | 10-2005-0102871 | 10/2005 |
| KR | 10-2012-0012452 | 2/2012 |
| KR | 10-2013-0016727 | 2/2013 |

OTHER PUBLICATIONS

Yin, Ya-Xia et al., "Electrospray Synthesis of Silicon/Carbon Nanoporous Microspheres as Improved Anode Materials for Lithium-Ion Batteries", The Journal of Physical Chemistry, 115, p. 14148-14154, Jun. 23, 2011.

Xiaochen Dong et al., "One-step growth of graphene-carbon nanotube hybrid materials by chemical vapor deposition", CARBON, 49, pp. 2944-2949, Mar. 6, 2011.

* cited by examiner

NEGATIVE ACTIVE MATERIAL FOR LITHIUM SECONDARY BATTERY, MANUFACTURING METHOD THEREOF AND LITHIUM SECONDARY BATTERY INCLUDING THE SAME

TECHNICAL FIELD

The present invention relates to a negative active material for a lithium secondary battery, a manufacturing method thereof, and a lithium secondary battery including the same.

BACKGROUND ART

The lithium secondary battery is a battery for charging and discharging by using oxidation and reduction of lithium ions and constituted by an anode, a cathode, and an electrolyte solution formed with an ion exchange membrane interposed therebetween.

For systems requiring larger capacity battery including electric vehicles, in such a lithium secondary battery, it is required to increase a capacity of the negative active material and increased an output characteristic and a lifespan characteristic. To this end, development for stable using of an alloy-based active material having a large capacity other than an existing carbon-based negative active material is required.

In the case of the existing carbon-based negative active material, a theoretical capacity is only 372 mAh/g, and due to insertion and separation between carbon layers of the lithium ions during charging and discharging, particularly, during high-speed charging, the output characteristic is significantly deteriorated.

Further, in the case of the alloy-based active material which is currently under research and development, electric conductivity is too low, and due to significant volume expansion during charging and discharging, serious plate damage is caused and a capacity is rapidly reduced. Accordingly, there is a very great difficulty in commercialization.

DISCLOSURE

Technical Problem

The present invention has been made in an effort to provide a next-generation material capable of replacing a negative active material (having low capacity and output characteristic) in the related art.

More particularly, the present invention has been made in an effort to provide a negative active material for a lithium secondary battery with excellent lifespan characteristic and output characteristic, a manufacturing method thereof, and a lithium secondary battery including the same.

Technical Solution

An exemplary embodiment of the present invention provides a negative active material for a lithium secondary battery including: a secondary particle in which a plurality of silicon nanoparticles are aggregated; and a plurality of metal particles distributed in pores in the secondary particle.

Some of the plurality of metal particles may form an alloy with some of the plurality of silicon nanoparticles.

Meanwhile, the metal particle will be described below.

The metal particle may be copper (Cu), iron (Fe), nickel (Ni), stainless steel, aluminum (Al), titanium (Ti), or a combination thereof.

The metal particle may be a combination of copper (Cu) and iron (Fe).

A diameter of the silicon nanoparticle may be 50 to 150 nm.

A diameter of the secondary particle may be 1 to 10 μm.

A weight ratio (silicon nanoparticles:metal particles) of the metal particles for the secondary particle may be 10:1 to 1:10.

A diameter of the pore in the negative active material for the lithium secondary battery may be 50 to 500 nm.

A porosity of the negative active material for the lithium secondary battery may be 30 to 60 volume % with respect to the entire volume (100 volume %) of the negative active material for the lithium secondary battery.

The negative active material may further include a coating layer which is positioned on the surface of the secondary particle and includes a carbon-based material, a polymer material, metal, metal oxide, or a combination thereof.

This case will be described below.

A thickness of the coating layer may be 5 to 50 nm.

Independently, the content of the coating layer may be 5 to 15 parts by weight with respect to the total weight of 100 parts by weight of the secondary particle and the metal particles.

The carbon-based material may be carbon nanotube (CNT), graphene, amorphous carbon, or a combination thereof.

More particularly, the carbon-based material may be a combination of carbon nanotube (CNT) and graphene.

Another exemplary embodiment of the present invention provides a manufacturing method of a negative active material for a lithium secondary battery including: preparing silicon nanoparticles; mixing the silicon nanoparticles and a metal precursor material; obtaining a metal oxide-silicon complex by hot-spraying the mixed silicon nanoparticles and metal precursor material; and obtaining a negative active material for a lithium secondary battery including a secondary particle aggregated with the plurality of silicon nanoparticles and metal particles distributed in a pore in the secondary particle, by heat-treating the metal oxide-silicon complex.

The metal in the metal precursor material may be copper (Cu), iron (Fe), nickel (Ni), stainless steel, aluminum (Al), titanium (Ti), or a combination thereof.

In the mixing of the silicon nanoparticles and the metal precursor material, a weight ratio (metal precursor material: silicon nanoparticles) of the metal precursor material to the silicon nanoparticles may be 10:1 to 1:10.

The obtaining of the metal oxide-silicon complex by hot-spraying the mixed silicon nanoparticles and metal precursor material may be performed in a temperature range of 150 to 300° C.

The obtaining of the negative active material for the lithium secondary battery including the secondary particle aggregated with the plurality of silicon nanoparticles and the metal particles distributed in the pore in the secondary particle by heat-treating the metal oxide-silicon complex may be performed in a temperature range of 350 to 450° C.

The preparing of the silicon nanoparticles may be thermally decomposing a raw material of the silicon nanoparticles.

In this regard, the raw material of the silicon nanoparticles may be $SiH_4$.

The manufacturing method may further include forming a coating layer including a carbon-based material on the surface of the obtained negative active material for the lithium secondary battery, after the obtaining of the negative active material for the lithium secondary battery including the secondary particle aggregated with the plurality of silicon nanoparticles and metal particles distributed in the pores in the secondary particle, by heat-treating the metal oxide-silicon complex.

The forming of the coating layer including the carbon-based material on the surface of the obtained negative active material for the lithium secondary battery may be performed by a chemical vapor deposition (CVD) process by using the carbon-based precursor.

The forming of the coating layer including the carbon-based material on the surface of the obtained negative active material for the lithium secondary battery may be performed in a temperature range of 850 to 950° C.

In the forming of the coating layer including the carbon-based material on the surface of the obtained negative active material for the lithium secondary battery, some of the plurality of metal particles may form an alloy with some of the plurality of silicon nanoparticles.

Independently, the manufacturing method may further include forming a coating layer including a polymer material, metal, metal oxide, or a combination thereof on the surface of the obtained negative active material for the lithium secondary battery, after the obtaining of the negative active material for the lithium secondary battery by heat-treating the metal oxide-silicon complex.

The forming of the coating layer including the polymer material, the metal, the metal oxide, or a combination thereof on the surface of the obtained negative active material for the lithium secondary battery may be performed by a sol-gel method or a spray method.

Yet another exemplary embodiment of the present invention provides a lithium secondary battery including: a cathode; an anode; and an electrolyte, in which the cathode includes a negative active material for the lithium secondary battery.

Advantageous Effects

According to the present invention, it is possible to provide a negative active material for a lithium secondary battery with excellent lifespan characteristic and output characteristic, a manufacturing method thereof, and a lithium secondary battery including the same.

MODE FOR INVENTION

Figure 1:
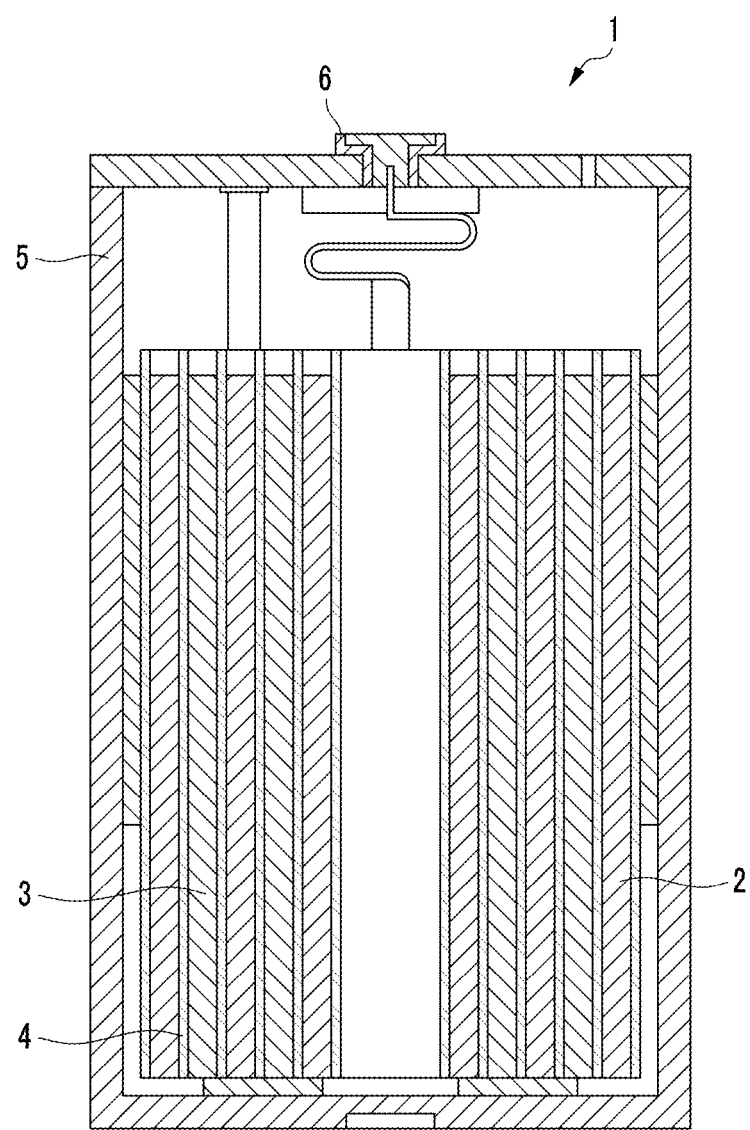
FIG. 1 is a diagram schematically illustrating a lithium secondary battery according to an exemplary embodiment of the present invention.

Hereinafter, exemplary embodiments of the present invention will be described in detail with reference to the accompanying drawings. As those skilled in the art would realize, the described embodiments may be modified in various different ways, all without departing from the spirit or scope of the present invention.

An exemplary embodiment of the present invention provides a negative active material for a lithium secondary battery including secondary particles aggregated with a plurality of silicon nanoparticles; and a plurality of metal particles distributed in the secondary particles.

A detailed form of the negative active material for the lithium secondary battery is a form in which a plurality of silicon particles having diameters of nano units is aggregated to form the secondary particle, pores are present between the silicon particles forming the secondary particle, and the metal particles are distributed in the pores, and similar to a pomegranate shape.

Particularly, some of the plurality of metal particles may form an alloy with some of the plurality of silicon nanoparticles.

That is, the metal particles distributed in the pore in the secondary particle form an alloy with the silicon particles therearound to form metal silicide to connect the silicon nanoparticles to each other and provide an electron transfer path for each of the silicon nanoparticles and may function as a rigid frame suppressing volume expansion of the silicon nanoparticle.

In summary, in the negative active material for the lithium secondary battery, a space (particularly, a pore in the secondary particle) required for a volume change of the silicon nanoparticles is provided in the secondary particle, the metal particles distributed in the secondary particle form an alloy with the silicon nanoparticles therearound to be connected to each other, and thus the metal particles are applied to the cathode plate to maintain stability even though the charging and discharging is repeated and improve a life-span characteristic of the battery.

Further, the stability of the negative active material for the lithium secondary battery may be significantly maintained even though the amount applied to the cathode plate is increased and contribute to improve the output characteristic of the battery.

Hereinafter, the negative active material for the lithium secondary battery will be described in more detail.

The silicon nanoparticles forming the secondary particle may be amorphous.

In the amorphous silicon nanoparticles, a capacity per weight of the particle is large, stress according to volume expansion during charging (that is, alloying with lithium) is significantly small compared to crystalline silicon nanoparticles, and alloying and dealloying speeds with lithium are large and thus it is advantageous to charging and discharging speeds.

Further, the metal particles are not particularly limited so long as the metal particles are conductive metal particles capable of providing an electron transfer path for each silicon nanoparticle. For example, the metal particle may be copper (Cu), iron (Fe), nickel (Ni), stainless steel, aluminum (Al), titanium (Ti), or a combination thereof.

Particularly, the metal particle may be a combination of copper (Cu) and iron (Fe). That is, copper particles and iron particles may be distributed in the pore in the secondary particle aggregated with the plurality of silicon nanoparticles. In this regard, the copper (Cu) contributes to improve charge efficiency of the negative active material and the iron (Fe) may contribute to improve stability of the negative active material.

Further, with respect to a carbon-based precursor, the copper (Cu) may function as a catalyst which grows graphene and the iron (Fe) may function as a catalyst which grows carbon nanotube (CNT). Accordingly, a coating layer including the carbon nanotube and the graphene may be formed on the surface of the metal particle as the secondary particle including the copper (Cu) and the iron (Fe), and the detailed contents will be described below.

Meanwhile, a diameter of the silicon nanoparticle may be 50 to 150 nm.

Further, a diameter of the secondary particle aggregated with the silicon particles having the diameters may be 1 to 10 μm.

Independently, a diameter of the pore in the negative active material for the lithium secondary battery may be 50 to 500 nm. The diameter means a diameter in a state where the plurality of metal particles is distributed in the pore in the secondary particle.

A porosity in the secondary particle with the pore having the diameter may be 30 to 60 volume % with respect to the entire volume (100 volume %) of the negative active material for the lithium secondary battery.

A weight ratio of the silicon nanoparticle for the secondary particle may be 10:1 to 1:10.

Meanwhile, the negative active material may further include a coating layer which is positioned on the surface of the secondary particle and includes a carbon-based material, a polymer material, metal, metal oxide, or a combination thereof.

As described below, the coating layer including the carbon-based material may be formed by using the carbon-based precursor by a chemical vapor deposition method in a temperature range of 850 to 950° C., and in the temperature range, some of the plurality of metal particles may form an alloy (that is, metal silicide) with some of the plurality of silicon nanoparticles. That is, the coating layer including the carbon-based material and the alloy may be simultaneously formed.

Independently, the coating layer including the polymer material, the metal, the metal oxide, or a combination thereof is coated by a sol-gel method or a spray method by using a material to be coated and then may be formed by low-temperature treatment in a temperature range of 350 to 450° C.

Meanwhile, the plurality of metal particles contributes to express conductivity of the negative active material for the lithium secondary battery, but when some thereof forms an alloy with some of the plurality of silicon nanoparticles, the electric conductivity may be slightly reduced.

However, the coating layer formed simultaneously with the alloy includes the carbon-based material, the polymer material, the metal, the metal oxide, or a combination thereof to restore the reduced electric conductivity.

As described above, when some of the plurality of metal particles form an alloy with some of the plurality of silicon nanoparticles, the electric conductivity may be reduced compared to a case without forming the alloy, but the coating layer including the carbon-based material, the polymer material, the metal, the metal oxide, or a combination thereof is formed to restore the reduced electric conductivity.

Particularly, a thickness of the coating layer may be 5 to 50 nm.

Independently, the content of the coating layer may be 5 to 15 parts by weight with respect to the total weight of 100 parts by weight of the secondary particle and the metal particle.

Particularly, the carbon-based material may be carbon nanotube (CNT), graphene, amorphous carbon, or a combination thereof.

Particularly, when the plurality of metal particles distributed in the secondary particle are copper (Cu) particles and iron (Fe) particles, the copper (Cu) may function as a catalyst growing graphene and the iron (Fe) may function as a catalyst growing carbon nanotube (CNT).

Accordingly, the coating layer may be formed when carbon nanotube (CNT) and graphene are irregularly grown on the surface of the secondary particle. That is, when considering the growth form of the coating layer, the thickness of the coating layer satisfies the aforementioned range and the thickness may not be uniform according to a position thereof.

Another exemplary embodiment of the present invention provides a manufacturing method of a negative active material for a lithium secondary battery including: preparing silicon nanoparticles; mixing the silicon nanoparticles and a metal precursor material; obtaining a metal oxide-silicon complex by hot-spraying the mixed silicon nanoparticles and metal precursor material; and obtaining a negative active material for a lithium secondary battery including a secondary particle aggregated with the plurality of silicon nanoparticles and metal particles distributed in a pore in the secondary particle, by heat-treating the metal oxide-silicon complex.

Particularly, when the silicon nanoparticles are prepared and mixed with the metal precursor material and then hot-sprayed, the plurality of silicon nanoparticles are aggregated with each other to form the secondary particle including the pore therein, whereas the metal precursor material is formed of metal oxide to be distributed in the pore in the secondary particle. In this case, the obtained material is the metal oxide-silicon complex.

When heat-treating the metal oxide-silicon complex, metal oxide in the metal oxide-silicon complex is thermally reduced to obtain a metal-silicon complex, that is, the negative active material including the secondary particle aggregated with the plurality of silicon nanoparticles and the metal particles distributed in the pore in the secondary particle.

In other words, the manufacturing method of the negative active material for the lithium secondary battery is a series of processes of obtaining the negative active material with the aforementioned form.

The obtained negative active material and respective elements configuring the negative active material are described above, and hereinafter, the respective steps will be described below.

In the mixing of the silicon nanoparticles and the metal precursor material, the metal in the metal precursor material may be copper (Cu), iron (Fe), nickel (Ni), stainless steel, aluminum (Al), titanium (Ti), or a combination thereof.

In detail, the metal precursor material may be nitrate, acetate, or chloride of the metal.

Meanwhile, in the mixing of the silicon nanoparticles and the metal precursor material, a weight ratio (metal precursor material:silicon nanoparticles) of the metal precursor material to the silicon nanoparticles may be 10:1 to 1:10. The reason of the limitation is the same reason as limiting a weight ratio of the metal particles to the secondary particle in the aforementioned negative active material.

Particularly, with respect to the total weight (100 wt %) of the silicon nanoparticles, the metal precursor material and the solvent, the silicon nanoparticles are contained with the content of 0.5 to 1 wt %, the metal precursor material is contained with the content of 1 to 2 wt %, and the solvent is contained with the remaining content.

More particularly, the mixing of the silicon nanoparticles and the metal precursor material may include injecting and distributing the metal precursor material in the solvent; and injecting and distributing the silicon nanoparticles in the solvent in which the metal precursor material is distributed.

In this case, the solvent is not particularly limited so long as the solvent is a solvent suitable to distribute the silicon nanoparticles and the metal precursor material, but uses distilled water (D.I. water) in Examples to be described below.

The obtaining of the metal oxide-silicon complex by hot-spraying the mixed silicon nanoparticles and metal precursor material may be performed in a temperature range of 150 to 300° C.

When hot-spraying the mixed silicon nanoparticles and metal precursor material in the temperature range, the metal oxide-silicon complex in the aforementioned form may be formed.

The obtaining of the negative active material for the lithium secondary battery including the secondary particle aggregated with the plurality of silicon nanoparticles and the metal particles distributed in the pore in the secondary particle by heat-treating the metal oxide-silicon complex may be performed in a temperature range of 350 to 450° C.

When heat-treating the metal oxide-silicon complex in the temperature range, the metal oxide included in the metal oxide-silicon complex is sufficiently thermally reduced and the metal particles may form an alloy with the silicon nanoparticles therearound by the heat, and as a result, the negative active material having the aforementioned form may be formed.

Meanwhile, the preparing of the silicon nanoparticles may be thermally decomposing a raw material of the silicon nanoparticles.

In this regard, the raw material of the silicon nanoparticles may be $SiH_4$. The preparing of the silicon nanoparticles may be performed in a temperature range of 500 to 600° C. by using the $SiH_4$ as the raw material of the silicon nanoparticles.

Further, the description for the silicon nanoparticles prepared by the thermal decomposition is as described above.

Further, the manufacturing method may further include forming a coating layer including a carbon-based material on the surface of the obtained negative active material for the lithium secondary battery, after the obtaining of the negative active material for the lithium secondary battery including the secondary particle aggregated with the plurality of silicon nanoparticles and the metal particles distributed in the pore in the secondary particle by heat-treating the metal oxide-silicon complex.

The forming of the coating layer including the carbon-based material on the surface of the obtained negative active material for the lithium secondary battery may be performed in a temperature range of 850 to 950° C.

Particularly, the forming of the coating layer including the carbon-based material on the surface of the obtained negative active material for the lithium secondary battery may be performed by a chemical vapor deposition (CVD) process by using the carbon-based precursor.

In this case, when the metal particles in the obtained negative active material for the lithium secondary battery are copper (Cu) particles and iron (Fe) particles, the carbon-based precursor may function as a catalyst to be grown to the coating layer including the carbon nanotube and the graphene and the detained description thereof is as described above.

Meanwhile, in the forming of the coating layer including the carbon-based material on the surface of the obtained negative active material for the lithium secondary battery, some of the plurality of metal particles may form an alloy with some of the plurality of silicon nanoparticles.

That is, in the temperature range, the coating layer is formed on the surface, and simultaneously, the coating layer including the carbon-based material may be internally formed on the surface of the obtained negative active material for the lithium secondary battery. In other words, the coating layer including the carbon-based material and the alloy may be simultaneously formed.

Independently, the manufacturing method may further include forming a coating layer including a polymer material, metal, metal oxide, or a combination thereof on the surface of the obtained negative active material for the lithium secondary battery, after the obtaining of the negative active material for the lithium secondary battery by heat-treating the metal oxide-silicon complex.

The forming of the coating layer including the polymer material, the metal, the metal oxide, or a combination thereof on the surface of the obtained negative active material for the lithium secondary battery may be performed by a sol-gel method or a spray method.

Particularly, the coating layer including the polymer material, the metal, the metal oxide, or a combination thereof is coated by the sol-gel method or the spray method by using a material to be coated and then may be formed by low-temperature heating in a temperature range of 350 to 450° C.

Yet another exemplary embodiment of the present invention provides a lithium secondary battery including a cathode; an anode; and an electrolyte, in which the cathode includes a negative active material for the lithium secondary battery according to any one described above.

The description of the negative active material for the lithium secondary battery and the manufacturing method thereof is as described above and constituent elements of the lithium secondary battery except for the negative active material may follow those which are generally known.

Particularly, the lithium secondary battery may further include a separator between the anode and the cathode.

The lithium secondary battery may be classified into a lithium ion battery, a lithium ion polymer battery and a lithium polymer battery according to kinds of the used separator and electrolyte, classified into a cylindrical shape, a rectangular shape, a coin shape, a pouch shape, and the like according to shape, and divided into a bulk type and a thin film type according to a size. The structure and the manufacturing the method of the batteries are widely known in the art and the minimal description will be described.

First, the cathode includes a current collector and a negative active material layer formed on the current collector and the negative active material layer may include any one negative active material among the aforementioned materials.

The negative active material layer may further include a cathode binder and selectively further include a conductor.

The cathode binder serves to attaching the negative active material particles to each other and attaching the negative active material to the current collector well. Of course, the cathode binder may also use a water-insoluble binder, a water-soluble binder, or a combination thereof.

The water-insoluble binder may include polyvinyl pyrrolidone, carboxylated polyvinyl chloride, polyvinyl fluoride, polymers including ethylene oxide, polyvinyl pyrrolidone, polyurethane, polytetrafluoroethylene, polyvinylidene fluoride, polyethylene, polypropylene, polyamide imide, polyimide, or combinations thereof.

The water-soluble binder may include styrene-butadiene rubber, acrylated styrene-butadiene rubber, polyvinyl alcohol, sodium polyacrylate, an olefin copolymer of propylene and 2 to 8 carbon atoms, a copolymer of (meth)acrylic acid alkyl ester, or combinations thereof.

In the case of using the water-soluble binder as the cathode binder, a cellulose-based compound capable of applying viscosity may be further included. The cellulose-based compound may be used by mixing one or more of carboxymethylcellulose, hydroxypropylmethylcellulose, methylcellulose, or an alkali metal salts thereof. The alkali metal may use Na, K or Li. The used content of the thickener may be 0.1 to 3 parts by weight with respect to 100 parts by weight of the binder.

Further, the conductor is used for applying conductivity to the electrode, and in the constituted battery, any electric conductive material without causing a chemical change may be used. For example, the conductor may use a conductive material including a carbon-based material such as natural graphite, artificial graphite, carbon black, acetylene black, ketjen black, and carbon fiber; a metal-based material such as metal powder such as copper, nickel, aluminum, and silver, or metal fiber; or a mixture thereof.

Further, the current collector may be selected from a group consisting of copper foil, nickel foil, stainless steel foil, titanium foil, nickel foam, copper foam, a polymer substrate coated with conductive metal, and combinations thereof.

Meanwhile, the anode includes a current collector and a positive active material layer formed on the current collector. The positive active material may use a compound (a ritiated intercalation compound) capable of reversible intercalation and deintercalation of lithium. Particularly, the positive active material may use one or more of complex oxides of metal selected from cobalt, manganese, nickel, and a combination thereof and lithium. As a more specific example, the positive active material may use a compound represented by any one of the following chemical formulas.

$Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $LiE_{1-b}X_bO_{2-c}D_c$ ($0 \le b \le 0.5$, $0 \le c \le 0.05$); $LiE_{2-b}X_bO_{4-c}D_c$ ($0 \le b \le 0.5$, $0 \le c \le 0.05$); $Li_aNi_{1-b-c}Co_bX_bD_\alpha$ ($0.90 \le a \le 1.8$, $0 \le b \le 0.5$, $0 \le c \le 0.05$, $0 < \alpha \le 2$); $Li_aNi_{1-b-c}Co_bXcO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Co_bX_bO_{2-\alpha}T_2$ ($0.90 \le a \le 1.8$, $0 \le b \le 0.5$, $0 \le c \le 0.05$, $0 < \alpha < 2$); $Li_aNi_{1-b-c}Mn_bX_cD_\alpha$ ($0.90 \le a \le 1.8$, $0 \le b \le 0.5$, $0 \le c \le 0.05$, $0 < \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dGeO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $LiaCoGbO2$ ($0.90 \le a \le 1.8$, $0.001 \le b \le 0.1$); $Li_aMnG_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMnG_bPO_4$ ($0.90 \le a \le 1.8$, $0.001 \le b \le 0.1$); $QO_2$; $QS_2$; $LiQS_2$; $V_2O_5$; $LiV_2O_5$; $LiZO_2$; $LiNiVO_4$; $Li_{(3-f)}J_2\,PO_{43}$ ($0 \le f \le 2$); $Li_{(3-f)}Fe_2\,PO_{43}$ ($0 \le f \le 2$); $LiFePO_4$ In the chemical formulas, A is selected from a group consisting of Ni, Co, Mn and a combination thereof; X is selected from a group consisting of Al, Ni, Co, Mn, Cr, Fe, Mg, Sr, V, rare earth elements, or a combination thereof; D is selected from a group consisting of O, F, S, P and a combination thereof; E is selected from a group consisting of Co, Mn and a combination thereof; T is selected from a group consisting of F, S, P and a combination thereof, G is selected from a group consisting of Al, Cr, Mn, Fe, Mg, La, Ce, Sr, V and a combination thereof; Q is selected from a group consisting of Ti, Mo, Mn and a combination thereof; Z is selected from a group consisting of Cr, V, Fe, Sc, Y and a combination thereof; and J is selected from a group consisting of Mn, Co, Ni, Cu and a combination thereof.

Of course, the positive active material may have a coating layer on the surface of the compound, or may be used by mixing the compound and the compound having the coating layer. The coating layer may include at least one coating element compound selected from a group consisting of oxides and hydroxides of the coating element, oxyhydroxides of the coating element, oxycarbonates of the coating element, and hydroxycarbonates of the coating element. The compound forming the coating layer may be amorphous or crystalline. The coating element included in the coating layer may use Mg, Al, Co, K, Na, Ca, Si, Ti, V, Sn, Ge, Ga, B, As, Zr or a mixture thereof. The process of forming the coating layer may use any coating method so long as the compound is coated by methods (for example, spray coating, immersing, and the like) without having a bad effect on properties of the positive active material by using these elements, and it can be understood well to those skilled in the art and thus the detailed description will be omitted.

The positive active material layer also includes an anode binder and a conductor.

The anode binder serves to attach the positive active material particles to each other and attach the positive active material to the current collector well.

Of course, the anode binder may use polyvinyl alcohol, carboxymethyl cellulose, hydroxypropyl cellulose, diacetyl cellulose, polyvinyl chloride, carboxylated polyvinyl chloride, polyvinyl fluoride, polymers containing ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, nylon, and the like, but is not limited thereto. However, at least one electrode of the anode and the cathode needs to include a copolymer including 8 and 9 repeated units.

The conduction is used for applying conductivity to the electrode, and in the constituted battery, any electric conductive material without causing a chemical change may be used. For example, the conductor may use natural graphite, artificial graphite, carbon black, acetylene black, ketjen black, carbon fiber, metal powder such as copper, nickel, aluminum, and silver, or metal fiber, and further, may be used by mixing one kind or at least one kind of conductive materials such as polyphenylene derivatives.

Further, the current collector may use Al, but is not limited thereto.

The cathode and the anode may be prepared by preparing the active material composition by mixing the active material, the conductor, and the binder and coating the composition on the current collector, respectively. Since the manufacturing method of the electrode is widely known in the art, the detailed description in this specification will be omitted. The solvent may use N-methylpyrrolidone and the like, but is not limited thereto.

Meanwhile, the lithium secondary battery may be a non-aqueous electrolyte secondary battery, and a non-aqueous electrolyte may include a non-aqueous organic solvent and a lithium salt.

The non-aqueous organic solvent serves as a medium in which ions involved in the electrochemical reaction of the battery are movable.

Further, as described above, a separator between the anode and the cathode may be present. The separator may use a multilayer of two or more layers of polyethylene, polypropylene, polyvinylidene fluoride, or two or more layers thereof and of course, may use a mixed multilayer such as a separator of two layers of polyethylene/polypropylene, a separator having three-layers of polyethylene/polypropylene/polyethylene, a separator of three layers of polypropylene/polyethylene/polypropylene, and the like.

FIG. 1 schematically illustrates a representative structure of the lithium secondary battery. Particularly, the lithium secondary battery 1 includes an anode 3, a cathode 2, a battery case 5 including an electrolyte impregnated in a separator present between the anode 3 and the cathode 2, and a sealing member 6 sealing the battery case 5.

DETAILED DESCRIPTION OF THE EMBODIMENTS

Hereinafter, preferred embodiments of the present invention are disclosed. However, the following Examples are just a preferred embodiment of the present invention and the present invention is not limited to the following Examples.

Example 1: Preparation of Negative Active Material for Lithium Secondary Battery Having Pomegranate-Shaped Metal-Silicon Complex Form, and Lithium Secondary Battery Including the Same (1) Preparation of Negative Active Material Preparation of Silicon Nanoparticles First, amorphous silicon nanoparticles were prepared.

Particularly, in a heat-treatment furnace in which an internal temperature is controlled to about 550° C., siliane ($SiH_4$) gas flows for 10 hrs with a flow rate of 100 sccm to prepare amorphous silicon nanoparticles of which an average diameter is about 100 nm.

Preparation of Metal Oxide-Silicon Complex

After the silicon nanoparticles were mixed with a metal precursor material, a metal oxide-silicon complex was prepared by hot spraying.

Particularly, the metal precursor material used a mixture in which iron nitrate and copper nitrate were mixed with a weight ratio (iron nitrate:copper nitrate) of 78:22 and the metal precursor material was injected and dispersed in distilled water (D.I. water) as a solvent.

Thereafter, in the solvent in which the metal precursor material was dispersed, the silicon nanoparticles were injected and dispersed. In this case, a weight ratio (metal precursor material:silicon nanoparticle) of the metal precursor material to the silicon nanoparticles was 31:69.

In summary, with respect to the total weight (100 wt %) of the silicon nanoparticles, the metal precursor material and the solvent, the silicon nanoparticles was contained with 0.7 wt %, the metal precursor material was contained with 1.5 wt %, and the solvent was contained with the remaining wt %.

Thereafter, the metal oxide-silicon complex was obtained by hot spray drying at about 200° C. By the hot spray drying, a plurality of silicon nanoparticles is aggregated to form a secondary particle including pores therein, whereas the metal precursor material was formed of metal oxide and distributed in the pores in the secondary particle to form the metal oxide-silicon complex.

Heat Treatment Metal of Oxide-Silicon Complex

As the final process of obtaining the negative active material for the lithium secondary battery, the metal oxide-silicon complex was heat-treated.

Particularly, the metal oxide-silicon complex was heat-treated for 360 minutes at a hydrogen ($H_2$) gas atmosphere of 400° C. and metal oxide (that is, copper oxide and iron oxide) in the metal oxide-silicon complex was reduced to metal particles (that is, copper particles and iron particles), and simultaneously, the metal particles and silicon were alloyed to be obtained as a negative active material of Example 1.

In the case, it was verified that the obtained negative active material of Example 1 had a pomegranate-shaped metal-silicon composite form as verified in Evaluation Example to be described below and the diameter thereof was about 5 μm. The pomegranate-shaped metal-silicon composite form is a form in which copper (Cu) particles and iron (Fe) particles are distributed in the pores in the secondary particle aggregated with the plurality of silicon nanoparticles.

(2) Preparation of Lithium Secondary Battery

The negative active material obtained in Example 1, a conductor (super P carbon black) and a binder (polyacrylic acid (PAA):carboxymethyl cellulose (CMC) were mixed with a volume ratio of 1:1, Sigma-Aldrich) were mixed with a weight ratio of 80:10:10 (negative active material:conductive material:binder) and dispersed in water, and then prepared in a slurry state.

The slurry was coated on copper foil (thickness: 18 μm) with a thickness of 12 μm by using a blade, an opposite electrode used lithium metal (Li metal), a polyethylene separator with a thickness of 20 μm was positioned between the cathode and the opposite electrode, and then an electrolyte was injected to prepare a coin-shaped half cell.

In this case, the electrolyte was used by adding 10 parts by weight of fluoro ethylene carbonate (FEC) as an additive to 100 parts by weight of a solution in which $LiPF_6$ was dissolved to be a concentration of 1.3 M in a mixed solvent (a volume ratio of EC:DEC=3:7) of ethylene carbonate (EC) and dimethyl carbonate (DEC).

Example 2: Preparation of Negative Active Material for Lithium Secondary Battery with Carbon-Based Coating Layer Formed on Surface of Negative Active Material of Example 1, and Lithium Secondary Battery Including the Same (1) Preparation of Negative Active Material A carbon-based coating layer was formed on the surface of the negative active material obtained in Example 1 to be obtained as a negative active material in Example 2.

Particularly, acetylene ($C_2H_2$) gas was used as a carbon-based precursor and flowed for 5 minutes with a flow rate of 1500 sccm per 1 minute to form a carbon-based coating layer on the surface of the negative active material obtained in Example 1.

In this case, it was verified that the carbon-based coating layer included carbon nanotube (CNT) and graphene as Evaluation Example to be described below.

(2) Preparation of Lithium Secondary Battery

A lithium secondary battery was prepared by the same method as Example 1 by using the negative active material obtained in Example 2.

Evaluation Example 1: Evaluation of Property of Negative Active Material (1) Observation of Scanning Electron Microscopy (SEM)

Figure 2:
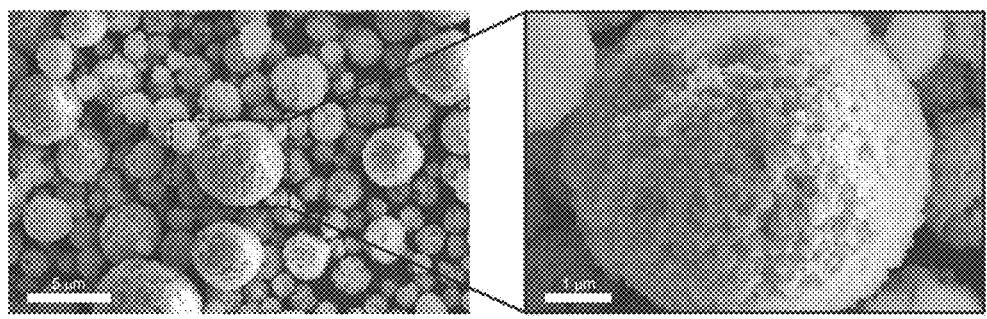
FIG. 2 is an SEM photograph of an appearance of a negative active material according to Example 1 of the present invention.
Figure 3:
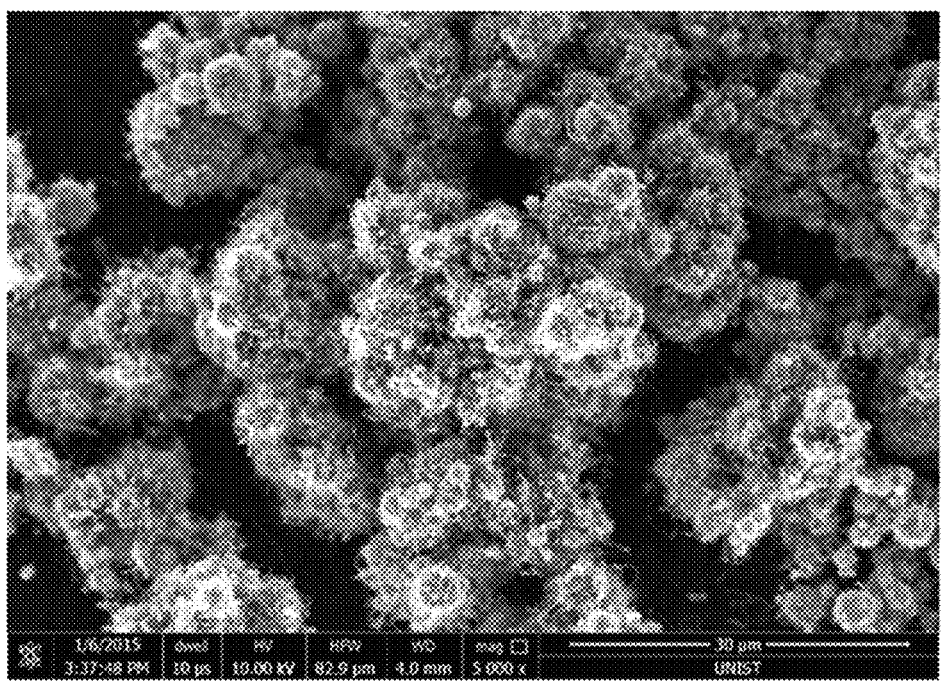
FIGS. 3 and 4 are SEM photographs an appearance of a negative active material according to Example 2 of the present invention.
Figure 4:
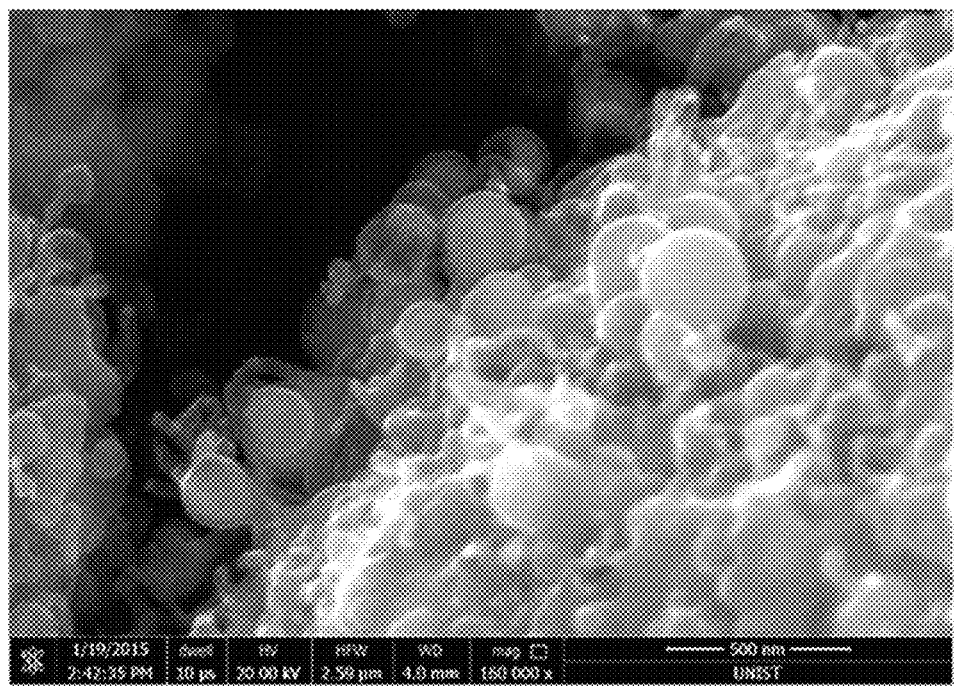

First, in order to observe appearances of the negative active materials obtained in Examples 1 and 2, the results were illustrated in FIG. 2 (Example 1) and FIGS. 3 and 4 (Example 2) by photographing SEM photographs.

Referring to FIG. 2, it can be seen that the negative active material of Example 1 has an average diameter of 5 μm and a secondary particle form.

Further, referring FIGS. 3 and 4, it can be seen that the negative active material of Example 2 has a diameter of 5 μm and a form in which the coating layer is formed on the surface of Example 1. More particularly, the coating layer is determined as a carbon-based coating layer including carbon nanotube (FIG. 3) and graphene (FIG. 4).

(2) Observation of Transmission Electron Microscopy (TEM) Photograph

Figure 5:
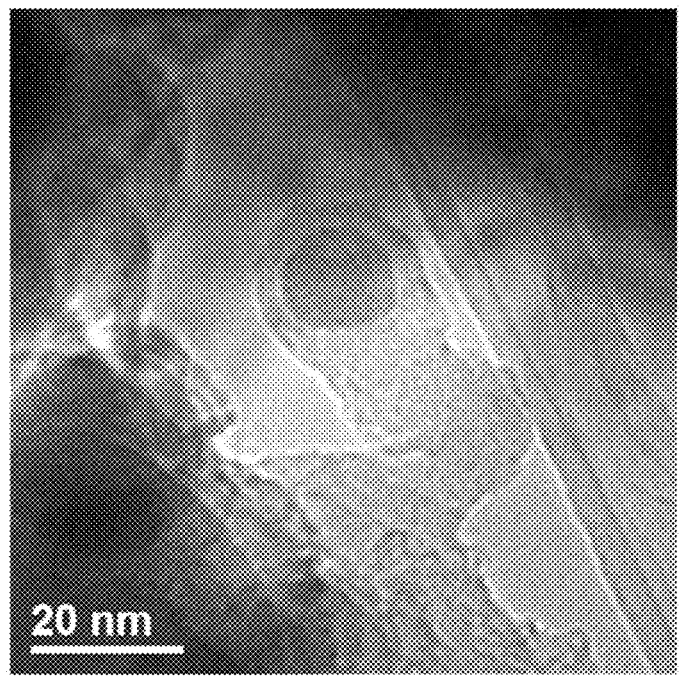
FIG. 5 is a TEM photographs an appearance of a negative active material according to Example 2 of the present invention.

More particularly, in order to determine a material forming the secondary particle commonly included in Examples 1 and 2 and a material forming the coating layer in Example 2, the result was illustrated in FIG. 5 by photographing a TEM photograph.

Referring to FIG. 5, it can be inferred that the metal particles included commonly in Examples 1 and 2 are copper particles and iron particles, and it can be verified that the materials included in the coating layer in Example 2 are carbon nanotube and graphene.

Figure 6:
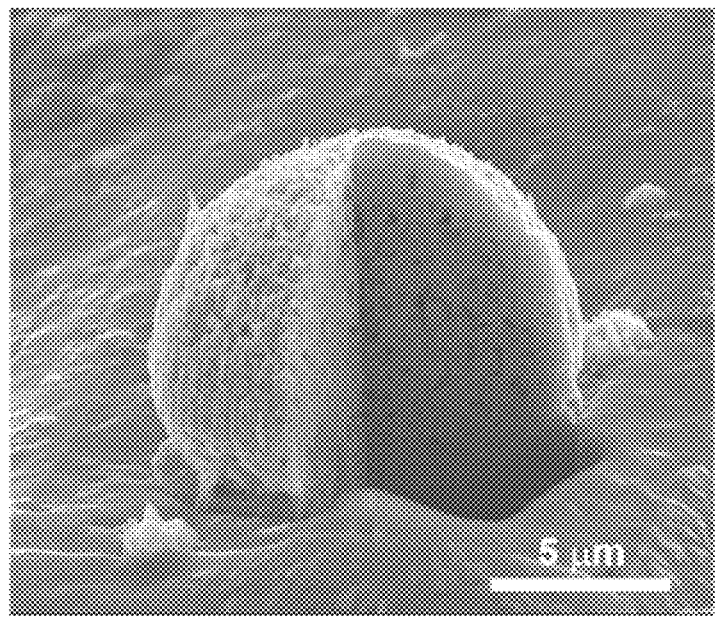
FIGS. 6 and 7 are SEM photographs a cross section of the negative active material according to Example 2 of the present invention.
Figure 7:
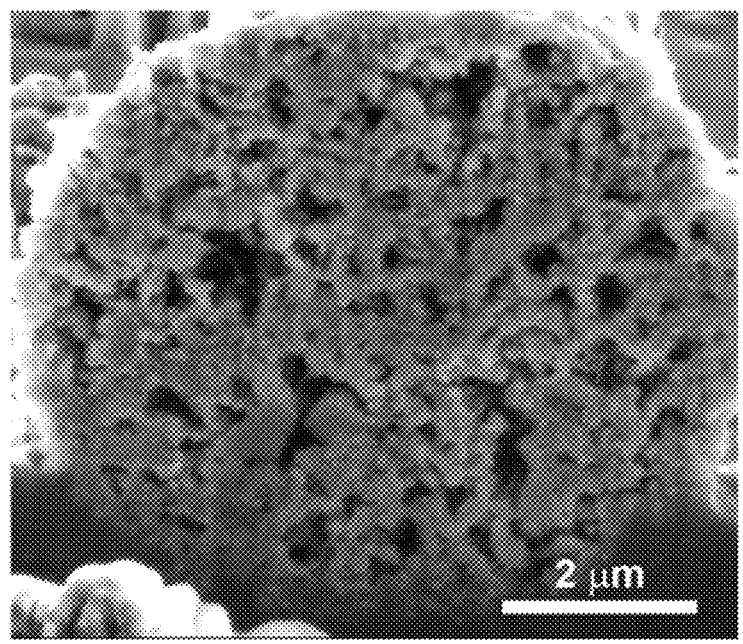

(3) Observation of Focused Ion Beam-Scanning Electron Microscopy (FIB-SEM) Photograph More particularly, the negative active material in Example 2 was cut by FIB and the results were illustrated in FIGS. 6 and 7 by photographing SEM photographs for the cut section.

Referring to FIGS. 6 and 7 in addition to the verified result of FIG. 5, it can be determined that the negative active material in Example 2 forms a secondary particle by forming a coating layer on the surface and aggregating silicon nanoparticles in the coating layer, a plurality of pores (porosity: a volume of the pores is 50 volume % with respect to 100 volume % of the secondary particle) is formed with various sizes of 100 to 200 nm in the secondary particle, and the copper particles and the iron particles are non-uniformly distributed in the pores.

Furthermore, it can be seen that graphene is grown at a portion with the copper particles and the carbon nanotube is grown at a position with the iron particles, and thus the thickness of the coating layer is not uniform.

Particularly, the coating layer includes carbon nanotube (CNT) having a diameter of 20 nm and a length of 1 to 2 μm and graphene having a thickness of about 5 nm.

Further, since Examples 1 and 2 have a difference only in existence of the coating layer, the negative active material in Example 1 has the same structure as the inner portion of the negative active material coating layer of Example 2.

(4) X-Ray Diffraction (XRD) Analysis

Figure 8:
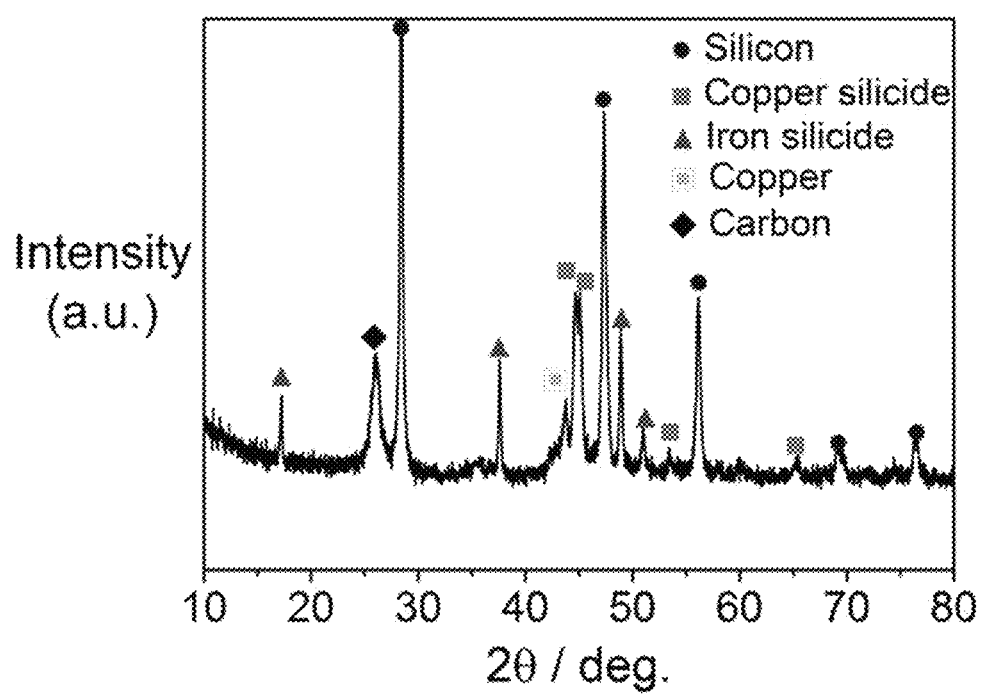
FIG. 8 is an XRD analysis result of the negative active material according to Example 2 of the present invention.

Furthermore, in order to analyze a crystal structural property in Example 2, the result was illustrated in FIG. 8 by performing an XRD analysis.

Figure 10:
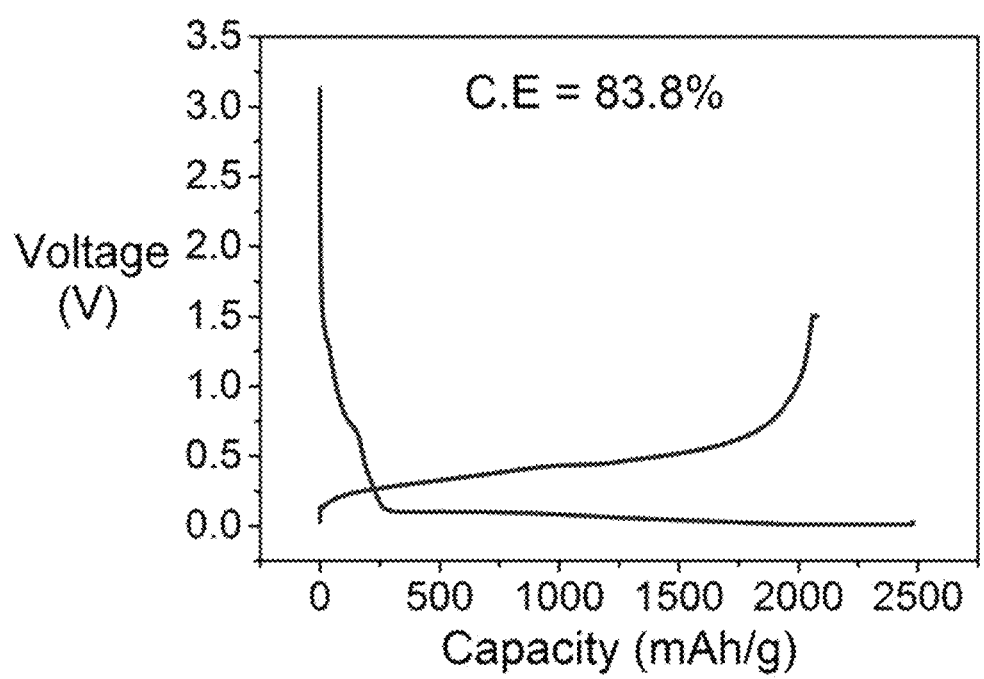
FIGS. 10 and 11 are graphs evaluating initial charging and discharging characteristics of respective lithium secondary batteries according to Examples of the present invention.

In FIG. 10, XRD peaks by silicon, copper silicide, and iron silicide are verified. Accordingly, it can be seen that in Example 2, the silicon nanoparticles form an alloy of copper and iron to be connected to each other.

From this, it can be inferred that at 900° C. where the coating layer is formed in Example 2, the silicon nanoparticles in the coating layer form an alloy of copper and iron.

(5) Analysis According to Differential Scanning Calorimetry (DSC)

Figure 9:
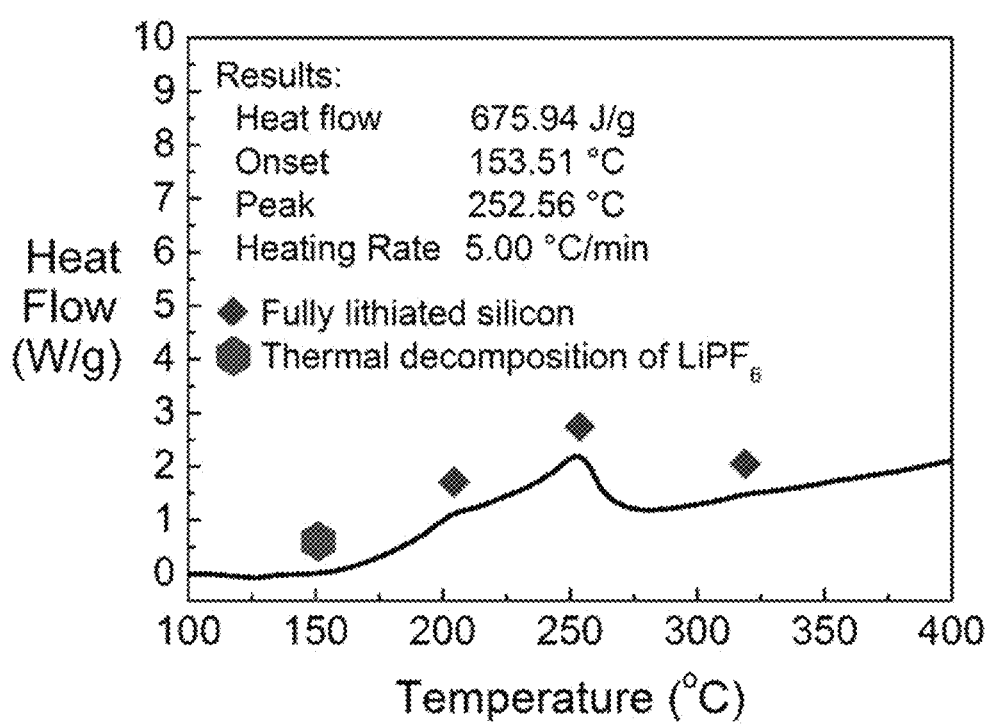
FIG. 9 is a DSC analysis result of the negative active material according to Example 2 of the present invention.

Meanwhile, in order to evaluate thermal stability of Example 2, the result was illustrated in FIG. 9 by performing a DSC analysis.

Referring to FIG. 9, with respect to the negative active material in Example 2, it can be evaluated that when the temperature is increased to 400° C., a heat flow entirely emitted may be verified, and a heat flow of 700 J/g or less is expressed, and the negative active material has excellent thermal stability.

It can be inferred that the thermal stability is caused by suppressing a decomposition reaction of the electrolyte by forming a stable thin film protecting the inside of the coating layer by the coating layer formed on the surface in Example 2.

Evaluation Example 2: Performance Evaluation of Lithium Secondary Battery (1) Evaluation of Initial Charge and Discharge Characteristics With respect to lithium secondary battery in Examples 1 and 2, at room temperature (25° C.), at a charge and discharge potential of 0.01 to 1.5V, charging and discharging is performed with a discharge and discharge current density of 0.1 C, and the result is illustrated in FIG. 10 (Example 1) and FIG. 11 (Example 2).

Referring to FIG. 10, in the lithium secondary battery in Example 1, it can be determined that excellent initial efficiency of 83.8% is expressed and a specific capacity is 2078 mAh·$g^{-1}$, and it can be seen that this has an effect by silicon nanoparticles included in the negative active material.

Figure 11:
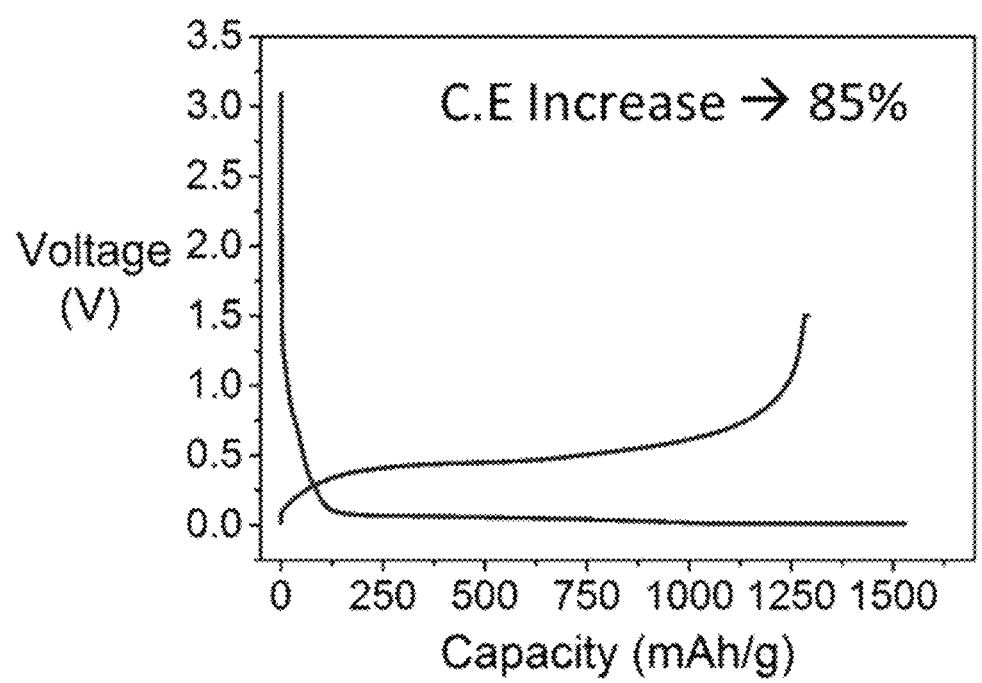

Meanwhile, referring to FIG. 11, in the lithium secondary battery in Example 2, it can be determined that more improved initial efficiency is expressed as 85% and the specific capacity is 1300 mAh·$g^{-1}$, and it can be seen that this is caused by the negative active material (particularly, graphene in the coating layer) with the coating layer formed on the surface unlike Example 1.

(2) Evaluation of Rate Characteristic and Life-Span Characteristic

Figure 12:
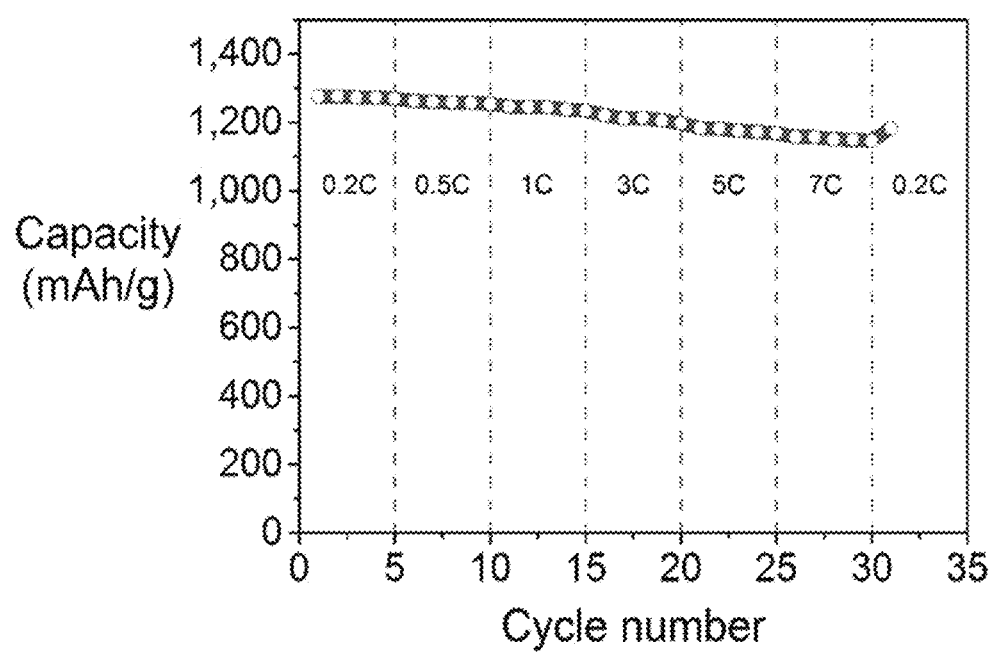
FIG. 12 is a graph of evaluating a rate characteristic of the lithium secondary battery according to Example 2 of the present invention.

With respect to the lithium secondary battery in Example 2, a charge velocity (that is, an insertion velocity of lithium) is fixed to 0.2 C, a discharge velocity (that is, an extraction velocity of lithium) is changed to 0.2 C, 0.5 C, 1 C, 3 C, 5 C and 7 C every 10 cycles, respectively, and finally, the lithium secondary battery is charged at 0.2 C and the result is illustrated in FIG. 12.

Figure 13:
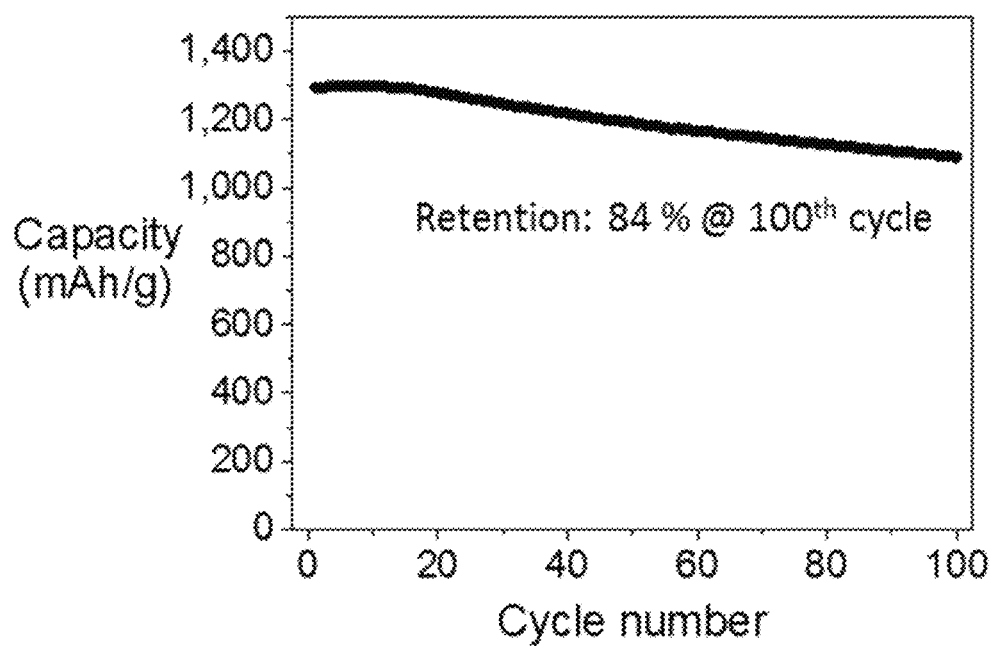
FIG. 13 is a graph of evaluation a life-span characteristic of the lithium secondary battery according to Example 2 of the present invention.

Further, with respect to the lithium secondary battery of Example 2, charging and discharging was performed for 100 cycles at 0.5 C rate and the result is illustrated in FIG. 13.

In the lithium secondary battery in Example 2, it can be verified that an excellent rate characteristic is expressed (FIG. 12), and particularly, a capacity of 84% is maintained after charging and discharging of 100 cycles (see FIG. 13), and the output and life-span characteristics are excellent.

(4) Evaluation of Volume Expansion Degree of Cathode Plate

Figure 14:
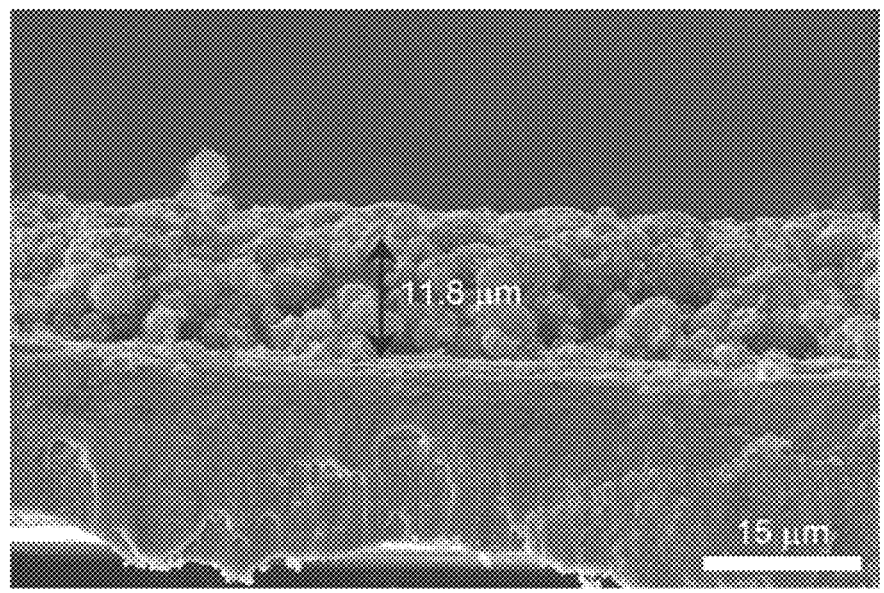
FIG. 14 is an SEM photograph of a cathode plate before evaluating the life-span characteristic of the lithium secondary battery according to Example 2 of the present invention.
Figure 15:
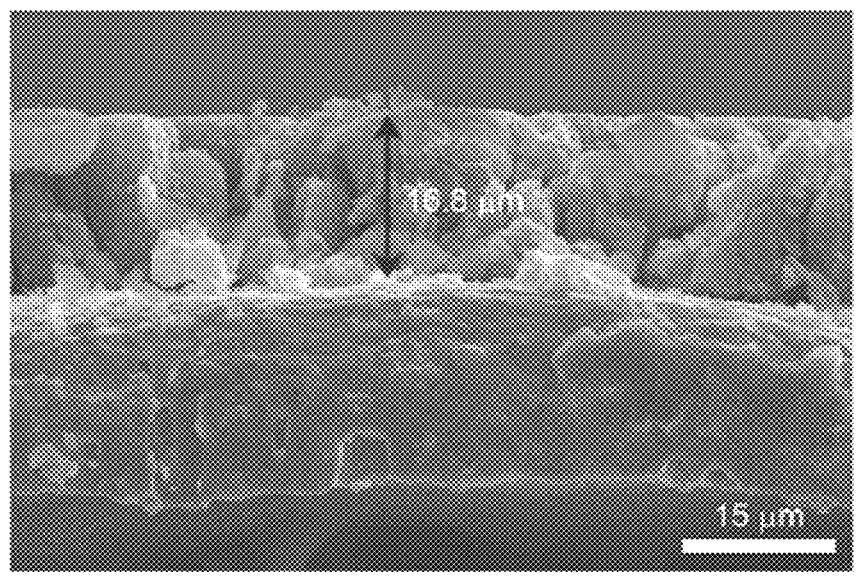
FIG. 15 is an SEM photograph of a cathode plate after evaluating the life-span characteristic of the lithium secondary battery according to Example 2 of the present invention.

With respect to the lithium secondary battery in Example 2, in order to evaluate a volume expansion degree of a cathode plate, the results are illustrated in FIG. 14 (before evaluating the life-span characteristic) and FIG. 15 (after evaluating the life-span characteristic) by photographing SEM photographs before and after evaluating the life-span characteristic.

It is verified that a thickness of the cathode plate before evaluating the life-span characteristic is 11.8 μm (FIG. 14) and a thickness of the cathode plate after evaluating the life-span characteristic is 16.8 μm (FIG. 15), and it can be seen that there is a thickness change of about 42% and it can be evaluated that the volume expansion degree of the cathode plate is small.

Further, with respect to the lithium secondary battery in Example 2, an electrochemical behavior is summarized in Table 1 below.

TABLE 1

| Material composition | Fe:Cu:Si:C = 15.84:8.64:65.52:10 |
|---|---|
| Initial capacity | 1300 mAh g$^{-1}$ |
| Cyclability | 84% @ 100$^{th}$ cycle (@ 0.5 C) |
| Initial C.E | 85% |
| Rate capability | 90% (@ 7 C vs. 0.2 C) |
| Thermal stability via DSC | 676 J g$^{-1}$ |
| Tap density | 0.8226 g cc$^{-1}$ |
| Electrode Volume expansion | 42% after 100 cycles |

As evaluated above, the excellent battery characteristic of the lithium secondary battery in Example 2 illustrated in Table 1 is caused by the negative active material in Example 2.

Particularly, in the lithium secondary battery in Example 2, it can seen that a higher initial capacity is ensured than the carbon-based negative active material by the silicon nanoparticles forming the secondary particle, and particularly, a space required for a volume change of the silicon nanoparticles during charging and discharging of the battery is provided in the pores in the secondary particle included in the negative active material, the iron particles and the copper particles are alloyed with the silicon nanoparticles to be connected to each other, thereby improving stability, improving the life-span characteristic, and improving the output characteristic by increasing an amount of the negative active material positioned in the cathode plate.

Furthermore, it is evaluated that by the carbon nanotube and graphene in the coating layer formed on the surface, the electric conductivity may be improved and thermal stability is ensured, and the initial charge and discharge characteristic, the output characteristic, and the life-span characteristic of the battery may be further improved.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. A negative active material for a lithium secondary battery, comprising:
   a secondary particle which is an aggregation of a plurality of silicon nanoparticles, the aggregation having pores present therein and an outer surface enclosing the aggregation;
   a plurality of metal particles distributed in the pores in the secondary particle; and
   a coating layer which is positioned on the outer surface of the secondary particle and includes a carbon-based material,
   wherein the carbon-based material is a combination of carbon nanotube (CNT) and graphene and
   wherein the metal particles are a combination of copper (Cu) and iron (Fe).

2. The negative active material for a lithium secondary battery of claim 1, wherein:
   some of the plurality of metal particles
   form an alloy with some of the plurality of silicon nanoparticles.

3. The negative active material for a lithium secondary battery of claim 1, wherein:
   a diameter of the silicon nanoparticle is 1 to 10 μm.

4. The negative active material for a lithium secondary battery of claim 1, wherein:
   a porosity of the negative active material for the lithium secondary battery is 30 to 60 volume % with respect to entire volume (100 volume %) of the negative active material for the lithium secondary battery.

5. The negative active material for a lithium secondary battery of claim 1, wherein:
   a diameter of the pore in the negative active material for the lithium secondary battery is 50 to 500 nm.

6. The negative active material for a lithium secondary battery of claim 1, wherein:
   a diameter of the silicon nanoparticle is 50 to 150 nm.

7. The negative active material for a lithium secondary battery of claim 1, wherein:
   a weight ratio (silicon nanoparticles:metal particles) of the metal particles for the secondary particle is 10:1 to 1:10.

8. The negative active material for a lithium secondary battery of claim 1, wherein:
   a thickness of the coating layer is 5 to 50 nm.

9. The negative active material for a lithium secondary battery of claim 1, wherein:
   the content of the coating layer is 5 to 15 parts by weight with respect to the total weight of 100 parts by weight of the secondary particle and the metal particles.

10. A lithium secondary battery, comprising:
    a cathode;
    an anode; and
    an electrolyte;
    wherein the cathode includes a negative active material for the lithium secondary battery according to claim 1.

* * * * *